Oct. 10, 1967  H. WAHLER  3,346,343
APPARATUS FOR CONTINUOUS ROTARY EXTRACTION
Filed Aug. 17, 1966  2 Sheets-Sheet 1

INVENTOR
HERMANN WAHLER
BY Jacobi & Davidson
His Attorney

Oct. 10, 1967 H. WAHLER 3,346,343
APPARATUS FOR CONTINUOUS ROTARY EXTRACTION
Filed Aug. 17, 1966 2 Sheets-Sheet 2

INVENTOR
HERMANN WAHLER
BY Jacobi & Davidson
His Attorney

United States Patent Office 3,346,343
Patented Oct. 10, 1967

3,346,343
APPARATUS FOR CONTINUOUS ROTARY EXTRACTION
Hermann Wahler, Zurich, Switzerland, assignor to Von Roll A.G., Gerlafingen, Switzerland
Filed Aug. 17, 1966, Ser. No. 572,943
Claims priority, application Switzerland, Aug. 24, 1965, 11,877/65
6 Claims. (Cl. 23—269)

ABSTRACT OF THE DISCLOSURE

An apparatus for the continuous extraction of material containing oil and/or fat with a solvent. The apparatus has a stationary housing with an upper cover through which the material to be treated and the solvent are fed. A rotor is mounted within the housing for rotation about a vertical axis and a plurality of collecting chambers are defined below the rotor by radial intermediate walls. The rotor defines an annular chamber having a permeable bottom spaced above the collecting chambers. The material to be treated and the solvent are received by the rotor, the oil and/or fat-rich solvent is continuously fed into and withdrawn from the collecting chambers, and de-oiled and/or de-fatted material is continuously removed through a discharge means communicating with the annular chamber of the rotor above the bottom of the same.

---

This invention relates to an apparatus for the continuous extraction of material containing oil and/or fat with a solvent and relates more particularly to a means for extracting oil and/or fat from a material with a solvent therefor in which the solvent is trickled downwardly through the material as the same is rotated about a vertical axis.

According to the basic concept of this invention, a revolving extraction apparatus is utilized having a stationary housing with an upper cover through which the material to be treated and the solved are fed. A rotor is mounted within the housing for rotation about a vertical axis and a plurality of collecting chambers are defined below the rotor by radial intermediate walls. The material to be treated and the solvent are received by the rotor which defines an annular chamber having a permeable bottom spaced above the collecting chambers. The oil and/or fat-rich solvent is continuously fed into, and withdrawn from, the collecting chambers and the de-oiled and/or de-fatted material is continuously removed through a discharge means communicating with the annular chamber of the rotor above the bottom of the same.

Known extraction apparatuses for the production of oil and/or fat from seeds, fruits or other such raw materials operate in such a manner that a solvent is fed counter-currently through the material to be treated so that, on the one hand, a mixture consisting of the solvent and the extracted oil and/or fat is obtained, commonly known as the miscella, and on the other hand, the de-oiled or de-fatted material, commonly referred to as the waste, is obtained. Of course, it is possible that the "waste" may have some further commercial value, but since it has had its oil and/or fat removed, it may be considered "waste" from the standpoint of the extraction techniques of the invention.

In these known apparatuses, attempts have been made to provide continuously operating techniques, but these attempts have been only partially successful.

Various prior art concepts have been utilized wherein the material to be subjected to extraction has been conducted rectilinearly, i.e., horizontally or vertically. Also, rotary techniques, preferably wherein the material being treated is conducted about a vertical axis of rotation, are known, and such procedures have utilized revolving extractors.

According to the known constructions of such revolving extractors, the material being treated is charged in batches into a container rotating about a vertical axis, the container being sub-divided by radial intermediate walls into sector-shaped chambers. The solvent is then conducted counter-currently through the individual chambers so that the mixtures of solvent and oil or fat, i.e., the miscella, is successively enriched. For this purpose, the individual chambers in known revolving extractors have permeable bottom portions which are constructed as grids or screens, and in some forms are connected to the individual chambers of the container for rotation therewith. Alternately, the grid or screen bottom is arranged in a stationary manner and the radial chamber walls of the container pass over the stationary bottom during their rotary movement. In yet another type of construction with rectilinear movement, the open-bottom chambers are closed below by a band which is entrained by friction by the chambers as they rotate.

This sub-division of the rotating container into separate chambers causes various limitations with regard to effecting a continuous execution of the process. First of all, such an arrangement requires batch charging of the individual chambers necessitating complicated charging and quantity-regulating means to insure that all of the chambers are filled as uniformly as possible. Further, the discharge of the de-oiled and de-fatted material from the individual chambers is also necessarily effected in a batch-wise manner. With constructions wherein the grid or screen bottoms rotate with the chambers, discharge of the "waste" is achieved by pivoting the bottoms outwardly or swinging them open. In the event of a stationary bottom portion, an appropriate sector-shaped aperture is provided through which the sector-shaped chambers are emptied each time they pass thereover. When an entrained lower closure band is utilized, the emptying of the chambers is effected by limits on the length of the band.

It will be apparent that in each instance described hereinabove the "waste" material is discharged from such prior art constructions intermittently. Apart from the fact that the means provided for the further conveyance of the "waste" must be capable of receiving this intermittent load, such an arrangement also requires that, at the working operation following the discharge step, the entire column height in the individual chambers must be re-established completely each time. The unavoidable differences in column height which are thus caused have disadvantageous effects in the form of different resistance to throughflow and different throughflow speeds of the solvent. This, in turn, prejudices the extraction efficiency. Prior art attempts to counteract such disadvantages necessitated arranging overflows at a specific height in the collecting chambers arranged below the screen bottoms for the solvent, but this technique is also undesirable in that a more or less considerable proportion of the liquid substance bypasses an extraction stage unused.

The primary object of the instant invention is to provide apparatuses for continuous solvent extraction free from the foregoing, and other, disadvantages. Basically, it is the objective of this invention to provide for the continuous extraction of fat and/or oil from a material containing the same utilizing a revolving or rotating extraction apparatus but permitting continuous feed of the material to be treated as well as the solvent and continuous removal of the fat and/or oil-rich solvent and the de-fatted and/or oiled "waste" material.

Yet another object of this invention is the provision of an extraction apparatus which avoids the necessity of a plurality of individual extraction chambers, but which is capable of providing the advantages of a continuous revolving extraction means. Such an apparatus contemplates the provision of a means for continuous solvent extraction wherein the de-fatted and/or de-oiled "waste" material is continuously removed from the extraction apparatus after substantially a full 360° treatment thereof during which the extracting effect of the solvent is operating on the material while the same is being rotated in the extractor.

A still further objective of the instant invention is the provision of apparatuses for continuous solvent extraction wherein the material being treated may be utilized as a permanent filter layer to assist in regulating the extraction operation.

Another object of the instant invention is the provision of a means for improving the extraction efficiency by locally accumulating material to be treated to provide spaced troughs for collecting solvent, such troughs preferably being positioned above collecting chambers for fat and/or oil-rich solvent.

Additionally, the instant invention provides apparatuses for continuous solvent extraction which may be utilized in various manners, either in a single-stage extraction or utilizing a starting material which has been preliminarily de-fatted and/or de-oiled mechanically or by some other extraction means.

A further object of the instant invention is the provision of extraction means which are sturdy and durable in construction, reliable and efficient in operation and relatively simple and inexpensive to manufacture, utilize and maintain, as well as extraction procedures which provide for highly efficient use of solvent material while providing excellent extraction at a minimal cost in time and materials.

Other and further objects reside in the combination of elements, arrangement of parts and features of construction in the apparatus.

Still other objects will in part be obvious and in part be pointed out as the description of the invention proceeds and as shown in the accompanying drawings wherein.

Like reference characters refer to like parts throughout the several views of the drawings.

The basic concepts of this invention are effected by charging the material to be treated in a single, coherent, annular layer and subjecting such annular layer continuously to the extractive action of the solvent during the rotary movement of the material. The apparatus for carrying out this concept utilizes an annular rotor consisting of a single annular permeable bottom, such as a screen or the like, and an at least approximately cylindrical side wall fixedly secured thereto with the rotor, in combination with an at least approximately cylindrical inner side wall of an annular housing defining the single annular chamber for receiving the material to be treated.

Figure 1:
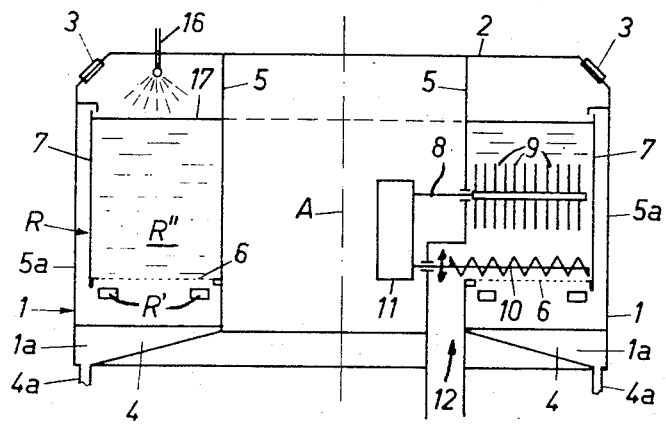
FIGURE 1 is a vertical cross-sectional view of a revolving extraction apparatus in accordance with this invention taken on line I—I of FIGURE 2.
Figure 2:
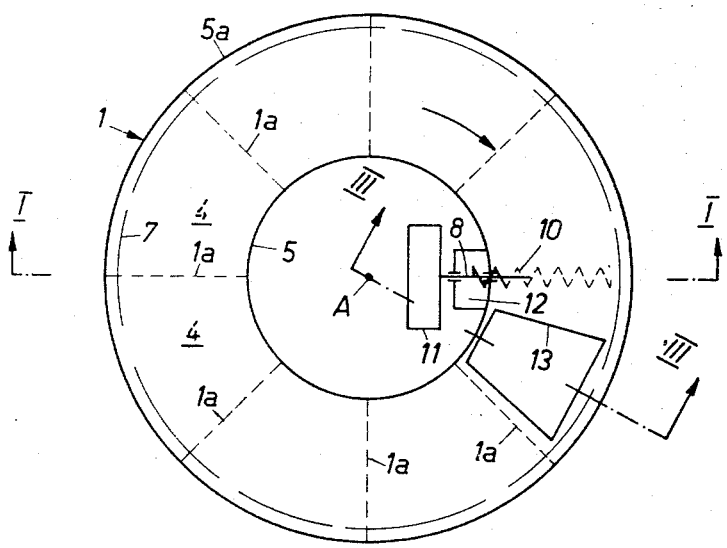
FIGURE 2 is a schematic top plan view of the extraction apparatus according to FIGURE 1.

The instant invention will more readily be understood by reference to the drawings, more particularly to FIGURES 1 and 2, wherein an at least approximately cylindrical housing 1 will be seen. This housing may be formed from sheet metal or other such material and has a gas- and liquid-tight construction. The top of housing 1 is closed by a tightly sealing cover 2 provided with inspection windows 3 and with means for introducing the material to be treated and the solvent, these means to be described in more detail hereinafter.

The lower end of housing 1 is sub-divided by radially arranged, intermediate walls 1a into a plurality of sector-shaped, collecting chambers 4 in which the mixture of solvent and oil and/or fat is collected. The radial intermediate walls 1a are only of a limited height and the chambers 4 formed by them are provided at their lowest point with outlet pipes 4a for discharging the mixture.

The housing 1 is annular in shape and closed at its inner side by an at least approximately cylindrical side wall 5 and at its outer side by a similar side wall 5a which walls are connected securely, and in gas-tight manner, to the cover 2 at their top and to the collecting chambers 4 at their bottom.

Arranged in the interior of the housing 1, and mounted to be rotatable about a vertical axis A, is a rotor R which is mounted on rollers R' or the like and is subjected to a continuous rotational movement by any conventional driving means (not shown). The rotor R consists of a single, annular, permeable bottom 6 in the form of a screen or the like, and an at least approximately cylindrical side wall 7 which is fixedly secured to the exterior periphery of the screen 6 and which, therefore, rotates together therewith.

The rotor R together with the inner side wall 5 of the stationary housing 1 defines a single annular chamber R" which serves to accommodate the material to be treated. It is important to note that the rotor R comprises no radial intermediate walls sub-dividing the annular chamber R" formed by the screen bottom 6, the outer rotor side wall 7 and the inner housing side wall 5 whereby the difficulties inherent with individual treating chambers referred to hereinabove are obviated.

Sealing-tightness between the rotating screen bottom 6 and the stationary inner side wall 5 on the one hand and between the outer rotating rotor side wall 7 and the stationary outer housing wall 5a on the other hand is guaranteed by any conventional well-known means (not shown) so that undesirable channelling or through-flow of the material to be treated or the solvent is prevented.

The discharging means for the treated material, i.e., the so-called "waste," consists of a scraper shaft 8 rotatably mounted in sealed relationship in the stationary inner housing side wall 5 and provided with a plurality of scraper arms 9 extending into the annular chamber R". The discharging means further includes a worm 10 also rotatably mounted in sealed relationship in side wall 5 and arranged below the scraper shaft 8, but above the rotating screen bottom 6. The scraper shaft 8 and the discharging worm 10 project from the inner housing wall 5 radially into the annular chamber R" of the rotor R covering substantially the entire radial width of the annular screen bottom 6.

The mounting arrangement of the discharging worm 10 is provided with any conventional adjusting means designated schematically by two-headed arrow in FIGURE 1 to permit variance of the vertical spacing between the worm 10 and the screen bottom 6.

Through suitable transmission means, an electric motor 11 or other suitable driving means continuously drives both the scraper shaft 8 and the discharge worm 10 at constant rotational speeds, these two transmissions being adapted to be regulated independently of one another, and preferably in an infinitely variable manner by any well-known conventional means (not shown). The electric motor 11 can also serve at the same time as a driving power source for continuously driving the rotor R, in which case a third, preferably infinitely variable, transmission (not shown) is arranged between the electric motor 11 and the rotor R.

The extracted waste conveyed by the worm 10 is removed from the extraction apparatus through a gravity chute 12.

Figure 3:
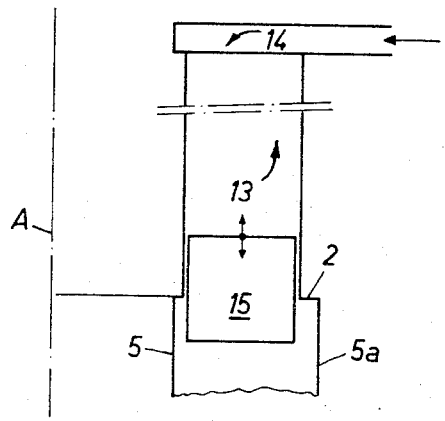
FIGURE 3 is a fragmentary cross-sectional view of a charging device for use with the apparatus of FIGURE 2 taken substantially on line III—III of FIGURE 2, parts being broken away for illustrative clarity.

The charging means for the material to be treated is shown diagrammatically in FIGURE 3. Basically, the feed material is charged through a vertical filling shaft 13 which communicates with the annular chamber R" through an opening in the cover 2. The filling shaft 13, which covers almost the entire radial width of the screen bottom 6, is connected at its upper end to any conventional feeding means communicating with a source of material to be treated (not shown). The feeding means is provided with a gas-tight closure 14 and any conventional layer height regulator shown schematically at 15 as adjustable from the outside in upward and downward directions, is provided in the filling shaft 13.

The solvent feed means comprises a plurality of spraying tubes 16 (only one of which is indicated diagrammatically in FIGURE 1 for illustrative convenience). The spraying tubes 16 are arranged in a circle and project through the cover 2 into the interior of the extractor.

FIGURE 2 shows diagrammatically the angular relationship of the filling shaft 13, the discharge worm 10, the scraper shaft 8, the gravity chute 12, the radial intermediate walls 1a of the stationary housing 1 and the collecting chambers 4 formed thereby. It will be readily seen from this view that the charged material, after it has been introduced through the filling shaft 13, is rotated through an angle of almost 360° in the direction of the arrow in FIGURE 2, to be then discharged as waste through the gravity chute 12.

The use and operation of the apparatus described hereinabove will now be readily understood. The rotor R, the scraper shaft 8 and the discharge worm 10 rotate continuously and at constant rotational speeds during the extraction procedure. The material to be treated is introduced in the annular chamber R" through the charging device 13, 14, 15 and may take various forms. The feed material may be raw material which has been subjected to an appropriate heat and mechanical pretreatment and is subjected in the revolving extraction apparatus of this invention to a single-stage extraction. Alternately, the feed material may have been previously pressed and thus already partly de-oiled and/or de-fatted. For example, the feed may be material from a mechanical press means preceding the extraction apparatus of this invention. Finally, the material concerned may have already been subjected to preliminary de-oiling and/or de-fatting by an extraction process in an extraction apparatus arranged upstream of the revolving extraction apparatus of this invention so that, in effect, the feed material is subjected to a so-called "two-stage extraction process." The upstream extraction apparatus can be constructed exactly like, or in a manner corresponding substantially to, the extraction apparatus described herein or may be a different type of extraction means.

The continuous charging of the material to be treated through the filling shaft 13 forms in the single annular chamber R" of the rotor R a single coherent annular layer 17 of material which rotates together with the rotor R at a continuous and constant rotational speed. The height of this layer 17 is adapted by appropriate adjustment of the layer height regulator 15 in any conventional manner to the actual conditions of the material to be treated.

The solvent is fed to the material to be treated through the spraying tubes 16, and the quantities of solvent introduced per unit of time at the various places where spraying tubes 16 are situated are adapted to be regulated, so that they can also be correlated to the nature of the material subjected to extraction and the particular working conditions resulting therefrom. The solvent then flows in a substantially vertical direction through the layer sector situated in each case exactly below an injection point (16) and in so doing exerts its extracting effect on the material being treated without requiring any kind of partition walls for this purpose in the rotor R.

The mixture which forms from the solvent and the oil and/or fat dissolved out of the material as the solvent passes vertically therethrough collects in the stationary collecting chambers 4 and is discharged through the outlet pipes 4a.

With the extraction apparatus described hereinbefore all known variants of counter-current extraction can be carried out, e.g., with local recirculation of the working liquid or with stepwise introduction of the infeed of solvent in an opposite directional rotation to the direction of rotation of the screen bottom 6. Thus, the fresh solvent can be introduced at the location where the material has already been substantially leached-out, more specifically, in the region of a layer sector which in relation to the path of rotation of the rotor R is situated a short distance upstream of the gravity discharge chute 12, while the mixture flow which is taken from the "last" collecting chamber 4, and contains most oil or fat, is introduced a short distance downstream of the point of introduction (13) of the fresh feed material which still has substantially its entire content of oil and/or fat. In an analogous manner, the mixture streams from the individual collecting chambers 4 occurring between the first fresh solvent introduction point and the last mixture discharge point are appropriately again introduced in a recirculation process into the rotating layer of material to be treated, whereby over the entire periphery of the extraction apparatus a uniform extracting "difference" is obtained between the actual degree of leaching of the material in each case and the oil and/or fat content of the associated stream of mixture introduced through a spraying tube 16. This guarantees a good degree of efficiency for the entire extraction process carried out in the revolving extraction apparatus.

In the course of rotational movement through approximately 360° above the axis A, the layer lying on the screen bottom 6 is subjected to continuous extraction and finally arrives in the leached-out state at the scraper shaft 8. The scraper is operated in such a manner that the scraper arms 9, the length of which are adapted to the usual layer height, engage upwardly into the continuously advancing layer wall and in so doing remove material successively which falls into the discharge worm 10. The worm 10 then conveys such material in a radial direction towards the axis A until it is removed from the apparatus through the chute 12.

This arrangement achieves an effectively continuous discharge of the extracted material, the so-called "waste," which guarantees not only uniform operation of the apparatus but also of the equipment arranged at the output end of the apparatus, such as, e.g., transporting or conveying means. Such continuous discharge of the treated material is particularly advantageous when, as mentioned hereinbefore, the apparatus is used only as an intermediate stage in a multi-stage extraction process since the continuous discharge of the material guarantees a uniform continuous operation of the downstream equipment.

Since the discharge worm 10 is mounted a certain distance above the screen bottom 6, a quantity of material always remains behind in a relatively thin layer, the height of which is determined by the distance between the lower edge of the worm 10 and the upper surface of the screen bottom 6. This thin layer, which could be referred to as the "basic layer," is completely leached-out and acts as a permanent filter layer. Since the height of the discharge worm 10 relative to the screen bottom 6 is adjustable, it is possible in the case of a particularly permeable, e.g., coarse-grained "main layer" to regulate the speed of throughflow of the liquid working substance within wide limits. If necessary, this spacing can allow for the presence of a "basic layer" formed of another material than the material to be treated in the apparatus, e.g., a special filter material, in order to increase the retention effect.

The mechanical equipment of the extraction apparatus which has been described hereinbefore supplemented by the requisite inlet and outlet connections, conduits and pumps which are not shown in the drawings, permits of any desired method of operation to be carried out for a continuous extraction process.

According to a further feature of this invention, with the help of well-known additional devices such as, pivotably arranged, radially disposed rakes or plough devices, small local accumulations can be provided at the surface of the layer 17 which move in relation to the advancing layer to form troughs between adjacent accumulations to facilitate collecting the introduced liquid working substance. More particularly, such an arrangement provides for the reliable localization of the vertical successive passages of the individual currents of liquid working substance through the layer 17.

Figure 4A:
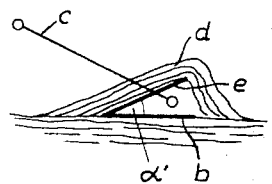
FIGURE 4A is a cross-sectional view of one of the baffle elements in FIGURE 4 taken at a point further from the center of the container.
Figure 4:
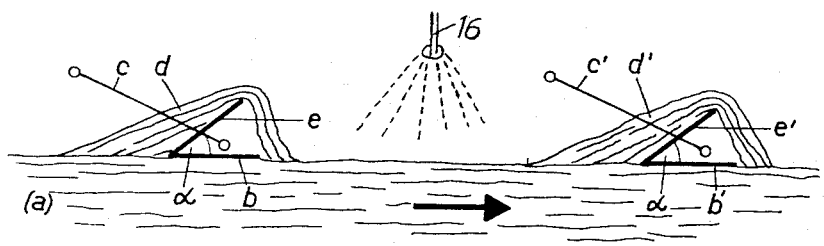
FIGURE 4 is a schematic cross-sectional view of certain baffle elements used in accordance with a preferred feature of the instant invention.

FIGURES 4 and 4A diagrammatically show one particular embodiment of baffle elements useful for this purpose, and the way in which they operate. Members having an acutely angled cross-section are provided extending radially over the entire width of the annular layer 17. Such elements are vertically adjustable and are disposed so as to engage the top of the layer 17 to form the aforementioned local accumulations.

The angle member $b$ shown in FIGURES 4 and 4A is adjustably secured in position by a pair of pivotable arms $c$ (only one is shown schematically in the drawings for illustrative convenience). The vertex of the angle member $b$ engages on the layer $a$ which advances continuously in the direction indicated by the arrow. Owing to the special profiling, the angle member $b$ lifts a portion of the layer $a$ and dams-up an accumulation of material $d$. The surplus material slides over the leg $e$ of the angle member $b$ and then falls back onto the layer $a$. At the next angle member $b'$ in succession, the same operation takes place, i.e., a portion of the material $a$ is lifted by the angle member $b'$ which is adjustably secured in position by pivotable arms $c'$ to form an accumulation of material $d'$ with the surplus sliding over the leg $e'$. Thus, successive accumulations $d$ and $d'$ form a trough therebetween.

The profiling of the angle member $b$ or $b'$, i.e., the size of the angle $\alpha$ is preferably not the same over the entire length of the angle member, but rather decreases towards the end furtherest away from the vertical axis $A$, as shown by the angle $\alpha'$ in FIGURE 4A. In this way, the baffle effect or the damming-up of accumulated material is effected to substantially the same extent over the entire layer width.

Preferably, the accumulations of material are produced above the partition walls $1a$ of the collecting chambers 4 whereby the troughs are formed above the sector-like collecting chamber spaces so that the solvent supplied to the layer in the region of the troughs is collected in the chambers situated directly therebelow. Also, it is desired that the angle members are spaced similarly to the partition walls $1a$ so that the troughs are similar in area to the collecting chambers 4.

The outlets and overflows in the collecting chambers 4 may be situated in a single plane and with some inclination so that any process modifications can be employed with local recirculation or intermittent countercurrent pumping.

Additionally, in the last sector, i.e., shortly before the material reaches the gravity discharge chute 12, the introduction of solvent is prevented in order to provide a drip-off zone for the leached-out or wetted material.

It will now be seen that there is herein provided improved apparatuses for continuous solvent extraction which satisfy all of the objectives of the instant invention, and others, including many advantages of great practical utility and commercial importance.

Since many embodiments may be made of the instant inventive concepts, and since modifications may be made of the embodiments hereinbefore shown and described, it is to be understood that all matter herein is to be interpreted merely as illustrative and not in a limiting sense. Accordingly,

What is claimed is:

1. A continuous solvent extraction apparatus comprising a stationary substantially cylindrical annular housing; a substantially cylindrical annular rotor mounted concentrically within said housing and adapted for rotation about its vertical axis; said rotor having an annular, permeable bottom member and a substantially cylindrical upstanding side member fixedly secured to the outer edge of said permeable bottom member for rotation therewith; said housing including a substantially cylindrical inner side wall spaced inwardly from said rotor side wall; said inner side wall being in sliding contact with the inner edge of said annular, permeable bottom member, and with said upstanding side member and said permeable bottom member together defining a single, continuous, annular chamber within said housing; a plurality of radial vertical partitions within the bottom of said housing beneath said permeable rotor bottom defining a plurality of individual collecting chambers; means for feeding a solid material having a component to be extracted into said annular chamber; means for feeding a solvent for extracting said component into said annular chamber; means for removing the component-rich solvent from each of said collecting chambers; and means for removing spent solids from said annular chamber; said solids removal means including horizontal rotatable scraper means mounted on the inner side wall of said housing and extending radially outwardly from said inner wall substantially across the entire width of said annular chamber; said scraper means being mounted a short distance upstream of the location where said solids material is fed into said annular chamber; means attached to the inner end of said scraper means for rotating said scraper means; a horizontal rotatable discharge worm extending radially outwardly through said inner side wall substantially across the entire width of said annular chamber; said worm being positioned below said scraper means and above said permeable rotor bottom; a discharge chute beneath the inner end of said worm; and means attached to the inner end of said worm for rotating said worm so as to convey scraped, leached-out material from said annular chamber to said chute.

2. Apparatus according to claim 1 wherein said means for rotating said scraper means and said worm comprise a single motor connected to said scraper means and said worm through a variable transmission capable of maintaining each at a constant speed.

3. Apparatus according to claim 1 further including a plurality of circumferentially spaced, horizontal radially extending baffle elements fixedly supported within said annular chamber above each of said radial partitions, said baffle elements having two intersecting planar surfaces presenting an acute angle to the solid material as it advances and positioned to engage the upper surface of said material to provide accumulations of said material for localizing solvent, said means for introducing solvent comprising a plurality of inlets for discharging solvent onto the surface of said solid material in the annular chamber, a solvent inlet being provided between each pair of successive baffle elements.

4. Apparatus as in claim 3 wherein the chute angle of intersection of the two planes presented to the solid material increases toward the inside edge of said annular chamber.

5. An apparatus according to claim 1 wherein said worm is slightly spaced above said rotor bottom, to provide for a filter layer on said rotor bottom.

6. An apparatus according to claim 5 further including means for adjusting the spacing between said worm and said rotor bottom.

References Cited

UNITED STATES PATENTS

| | | | |
|---|---|---|---|
| 275,989 | 4/1883 | Byerley | 23—269 X |
| 805,229 | 11/1905 | Parrish | 23—269 X |
| 1,150,263 | 8/1915 | Godbe | 23—269 |
| 2,832,765 | 4/1958 | Robert | 23—309 X |
| 3,248,263 | 4/1966 | Silver | 127—4 X |

FOREIGN PATENTS 741,585   12/1966   Great Britain.

NORMAN YUDKOFF, *Primary Examiner.*
WILBUR L. BASCOMB, Jr., *Examiner.*
S. J. EMERY, *Assistant Examiner.*